United States Patent
Levine (10) Patent No.: US 7,778,896 B2
(45) Date of Patent: Aug. 17, 2010

(54) SYSTEMS AND METHODS FOR DIRECT ELECTRONIC TRADING OF DEPOSITARY RECEIPTS

(75) Inventor: Andrew P Levine, New York, NY (US)

(73) Assignee: BNY ConvergEx Group LLC, New York, NY (US)

( * ) Notice: Subject to any disclaimer, the term of this patent is extended or adjusted under 35 U.S.C. 154(b) by 2112 days.

(21) Appl. No.: 10/309,750

(22) Filed: Dec. 3, 2002

(65) Prior Publication Data

US 2004/0107156 A1 Jun. 3, 2004

(51) Int. Cl.
*G06Q 40/00* (2006.01)
(52) U.S. Cl. .......................... 705/32; 705/35
(58) Field of Classification Search ................. 705/32, 705/40, 37, 35
See application file for complete search history.

(56) References Cited

U.S. PATENT DOCUMENTS 5,872,844 A * 2/1999 Yacobi ........................ 705/69
2003/0220869 A1* 11/2003 Colle et al. .................. 705/37

* cited by examiner

*Primary Examiner*—Thu Thao Havan
(74) *Attorney, Agent, or Firm*—Byrne Poh LLP (57) ABSTRACT

An electronic DR conversion system includes a DR authority that interfaces with investors through the investor's order management system. When an investor has purchased or sold ordinary shares in a local market and wishes to convert them to, or cancel DRs, the investor can so instruct the DR authority. The DR authority will automatically obtain a foreign exchange rate for the transaction and compute a pass through cost, which is displayed to the investor via their order management system. If the investor accepts the pass through cost, then the DR authority can be configured to automatically issue a plurality of directions to the computer systems of various entities that will be involved in the issuance or cancellation process.

35 Claims, 6 Drawing Sheets

SYSTEMS AND METHODS FOR DIRECT ELECTRONIC TRADING OF DEPOSITARY RECEIPTS

BACKGROUND

1. Field of the Inventions

The field of the invention relates generally to electronic securities trading and more particularly to an electronic securities trading system that includes automated issuance and conversion of Depositary Receipts.

2. Background Information

The desire of individual and institutional investors to diversify their portfolios, reduce risk, and invest internationally in the most efficient manner possible has driven the demand for Depositary Receipts (DRs), which include American DRs (ADRs), Global DRs (GDRs), European DRs (Euro DRs), and New York Shares (NYSs). When registered in the U.S. DRs are negotiable U.S. securities that generally represent a non-U.S. company's publicly traded equity. Although typically denominated in U.S. dollars, DRs can also be denominated in other currencies. Further, DRs can be eligible to trade on all U.S. stock exchanges as well as on many other, non-U.S. stock exchanges.

While investors may recognize the benefits of global diversification, they also often understand the challenges presented when investing directly in local trading markets. These obstacles can include inefficient trade settlements, uncertain custody services, and costly currency conversions. DRs overcome many of these operational and custodial hurdles inherent in international investing. Moreover, cost benefits and conveniences may be realized through DR investing, thus allowing those who invest internationally to achieve the benefits of global diversification without the added expense and complexities of investing directly in the local trading markets.

DRs are issued when a broker purchases a non-U.S. company's shares on a local stock market, i.e., in the home country of the non-U.S. company, and delivers those shares to the depositary's local custodian bank, which then instructs a depositary bank to issue DRs. In addition, DRs can also be purchased in the U.S. secondary trading market. Just like any other U.S. security, DRs can be freely traded, either on an exchange or in the over-the-counter market, and can be used to raise capital.

DRs can be more specifically referred to as ADRs, Rule 144A DRs, or GDRs. These names typically identify the market in which the DRs are available: ADRs are publicly available to U.S. investors on a national stock exchange or in the over-the-counter market; Rule 144A ADRs are privately placed and resold only to Qualified Institutional Buyers (QIBs) in the U.S. QIB PORTAL market; and GDRs are generally available in one or more markets outside the foreign company's home country, although these may also be known as ADRs.

Currently, there are over 2,000 ADR programs for companies from over 70 countries. The establishment of a DR program, and in particular an ADR program, offers numerous advantages to non-U.S. companies. The primary reasons to establish a DR program can be divided into two broad considerations: capital and commercial. Some specific advantages of DRs for a foreign company include: expanded market share through broadened and more diversified investor exposure with potentially greater liquidity, which may increase or stabilize the share price; enhanced visibility and image for the company's products, services and financial instruments in a marketplace outside its home country; flexible mechanism for raising capital and a vehicle or currency for mergers and acquisitions; and DRs enable employees of U.S. subsidiaries of non-U.S. companies to invest more easily in the parent company.

When investors aim to diversify their portfolios internationally, obstacles such as undependable settlements, costly currency conversions, unreliable custody services, poor information flow, unfamiliar market practices, confusing tax conventions, and internal investment policy can discourage institutions and private investors from venturing outside their own local market. DRs, e.g., ADRs, can help to address some or all of these problems. Some specific examples of the advantages of DRs to investors include: quotation in U.S. dollars and payment of dividends or interest in U.S. dollars; diversification without many of the obstacles an investor or other institutions may have in purchasing and holding securities outside of their home market; elimination of global custodian safekeeping charges; familiar trade, clearance and settlement procedures; competitive U.S. dollar/foreign exchange rate conversions for dividends and other cash distributions; and the ability to acquire the underlying securities directly upon cancellation.

DRs are issued or created when investors decide to invest in a non-U.S. company and contact their brokers to make a purchase. These brokers, through their international offices or through a local broker in the company's local market, purchase the underlying ordinary shares and request that the shares be delivered to the depositary bank's custodian in the foreign country. The broker who initiated the transaction will convert the U.S. dollars received from the investor into the corresponding foreign currency and pay the local broker for the shares purchased. On the same day that the shares are delivered to the custodian bank, the custodian notifies the depositary bank. Upon such notification, DRs are issued and delivered to the initiating broker, who then delivers the DRs evidencing the shares to the investor. A broker can also obtain DRs by purchasing existing DRs in the U.S. secondary market, which is not a new issuance.

Generally, when a DR holder sells, the DRs can either be sold to another U.S. investor or it can be canceled and the underlying shares can be sold to a non-U.S. investor. When investors want to sell their DRs, they notify their broker. The broker can either sell the DRs in the U.S. market through a secondary market trading transaction or sell the shares outside of the U.S., typically into the local market through a cross-border transaction. In cross-border transactions, brokers, either through their international offices or through a local broker in the company's local market, will sell the shares back into the home market. In order to settle the trade, the U.S. broker will surrender the DRs to the depositary bank with instructions to deliver the shares to the buyer in the local market. The depositary bank will cancel the DRs and instruct the custodian to release the underlying shares and deliver them to the local broker who purchased the shares. The broker will arrange for the foreign currency to be converted into U.S. dollars for payment to the DR holder.

In intra-market transactions, DRs can be sold to subsequent U.S. investors by simply transferring them from the existing DR holder (seller) to another DR holder (buyer). An intra-market transaction is settled in the same manner as any other U.S. security purchase, i.e., in U.S. dollars on the third business day after the trade date and typically through the Depository Trust Company (DTC). Intra-market trading accounts for the vast majority of all DR trading in the market today.

Once there are an adequate number of DRs outstanding in the U.S. market, e.g., when 3-6 percent of a company's shares are in DR form, a true intra-market trading market emerges. Until this market develops, the majority of DR purchases result in DRs being issued upon the deposit of shares. When executing a DR trade, brokers seek to obtain the best price by comparing the DR price in U.S. dollars to the dollar equivalent price of the actual shares in the local market. Brokers will buy or sell in the market that offers them the best execution price and they can do so in three ways: by issuing a new DR, canceling a DR, or U.S. secondary market trading. For example, if the price of the actual shares in the local market is $12.28 per share after allowing for foreign currency translation, and the DR is selling for $12.30, the broker will buy shares and issue DRs until the price of the ordinary shares increases to $12.30, at which time the broker will simply buy and sell the existing DRs that are outstanding in the market. The broker may also be holding an inventory of ordinary shares, in which case the local trading price is irrelevant. The continuous buying and selling of DRs in either market tends to keep the price differential between the local and U.S. markets to a minimum.

When a non-U.S. company completes an offering of new shares, part of which will be sold as DRs, e.g., ADRs, in the U.S. or international market, the company will deliver the shares to the depositary bank's local custodian at the time of the closing. The depositary bank will then issue the corresponding DRs and deliver them to the members of the underwriting syndicate. With this pool of DRs, a regular trading market can commence where DRs can be issued, canceled, or traded in the U.S. secondary market.

Thus, DRs can be used to facilitate cross-border trading and to raise capital in global equity offerings or for mergers and acquisitions to U.S. and non-U.S. investors. Over the last ten years demand by investors for DRs has grown significantly. As mentioned, this growth is driven in large part by the increasing desire of retail and institutional investors to diversify their portfolios globally. Many of these investors typically do not, or cannot for various reasons, invest directly outside of the U.S. and, as a result, use DRs as a means to diversify their portfolios. Many investors who do have the capabilities to invest outside the U.S. may still prefer to use DRs because of the convenience, enhanced liquidity, and cost effectiveness DRs offer as compared to purchasing and safekeeping ordinary shares in the home country. In many cases, a DR investment can save an investor up to 10-40 basis points annually as compared to all of the costs associated with trading and holding ordinary shares outside the United States.

A limitation of conventional DR trading systems and methods is that there is presently no ability for an investor to directly and electronically access a local trading market and electronically settle the trade in the U.S. through DRs and in U.S. dollars. This is because global electronic trading is a recent development as is direct, electronic foreign exchange trading. Further, DR conversion is presently a manual process in conventional systems. Another limitation is that for many investors, the conversion process, i.e., the factors that effect the ultimate cost of conversion, is not always transparent to the investor.

SUMMARY OF THE INVENTION

A system for investors that enables direct trading in a non-U.S. equity market and taking settlement in DRs. The system includes a DR authority interfaced with a database that stores information for the conversion and cancellation of DRs including, for example, the price of the associated ordinary shares, the conversion cost, broker fees, conversion ratio, commission information, and foreign exchange rate. When an investor has indicated that they want to convert purchased ordinary shares to DRs, for example, the DR authority can automatically establish a connection with a foreign exchange dealer authority to obtain a firm exchange rate quote for the foreign currency associated with the local market in which the ordinary shares were purchased. Once the DR authority has obtained the quoted exchange rate, it can compute a pass through cost for the transaction based on the information contained in the database.

In one aspect, the quoted exchange rate is good for a certain period of time. Thus, the DR authority can present the pass through cost to the investor for approval. If the investor approves within the allotted time, then the DR authority can accept the quoted exchange rate.

In another aspect of the invention, once the exchange rate is accepted, the DR authority can be configured to automatically communicate instruction to the computer systems of various transaction participants to ensure the conversion is carried out as directed.

In still another aspect of the invention, DR information, such as the ordinary share price, foreign exchange rate, and pass through cost as well as some or all of the information included in the database can be displayed to the investor.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

The example embodiments described below are generally described in relation to the issuance and cancellation of ADRs. It will be apparent, however, that the systems and methods described herein are not necessarily limited to ADRs. To illustrate this point, the term Depositary Receipt (DR) is used in the description below to indicate that potentially any type of DR can be traded using the systems and methods described herein.

Figure 1:
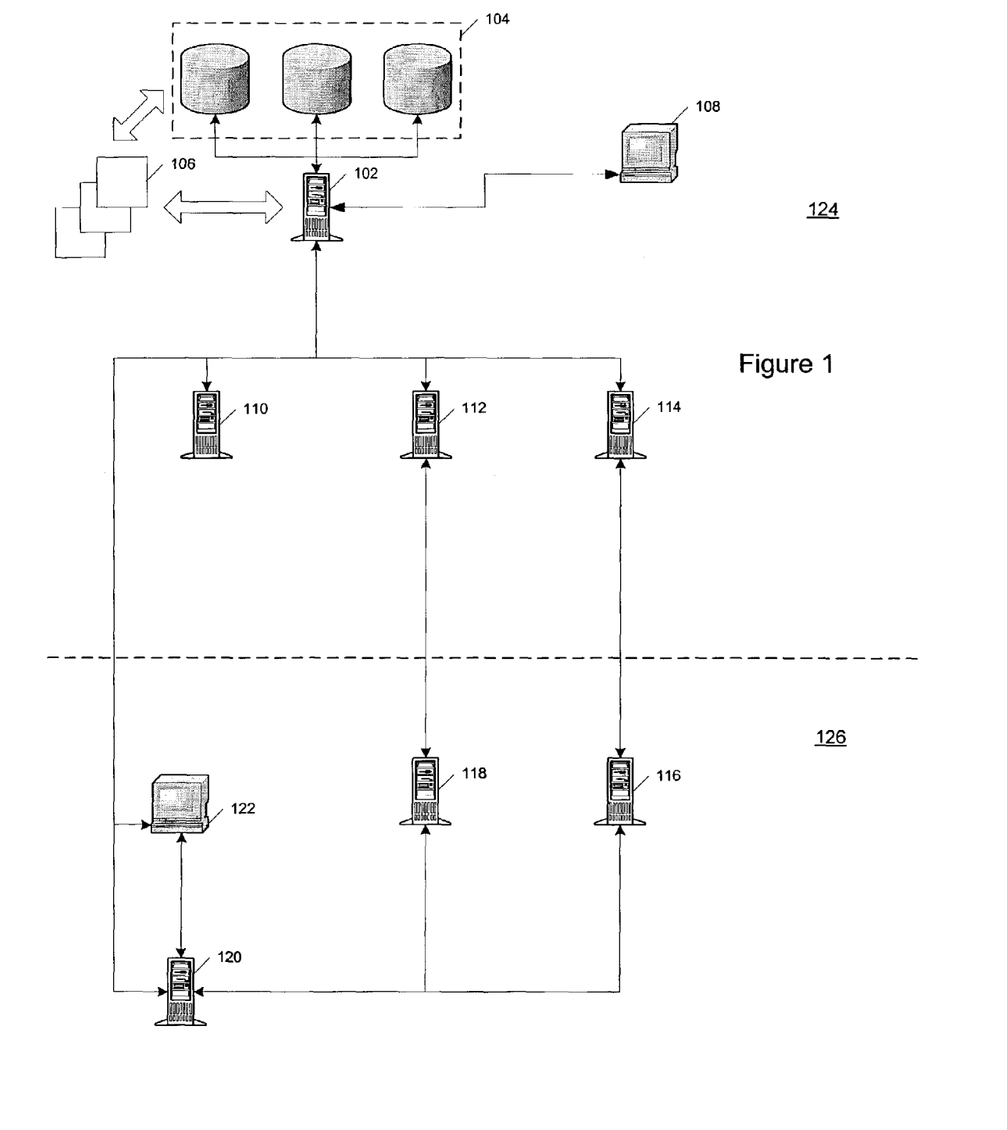
FIG. 1 is a diagram illustrating an example direct DR trading system in accordance with one embodiment of the invention.

FIG. 1 is a diagram illustrating an example direct DR trading system 100 in accordance with one embodiment of the systems and methods described herein. System 100 comprises a DR authority 102 interfaced with a database 104. As illustrated, database 104 can actually comprise a plurality of databases depending on the embodiment. An investor can interface with DR authority 102 using a client terminal 108. Client terminal 108 can be any type of terminal configured to carry out the functions and methods described herein. Thus, terminal 108 can, for example, be a personal computer, such as a desktop or laptop computer. Alternatively, terminal 108 can be a specialized terminal, or can comprise a specialized interface for interfacing with DR authority 102. The specialized interface can comprise customized hardware and/or software configured to enable terminal 108 to access the features and functions of DR authority 102. This customized interface is often referred to as an order management system. The order management system can, for example, comprise a third party or a customized order management system.

As illustrated, system 100 is divided into two regions 124 and 126. Region 126 represents the local market associated with a non-U.S. company, and region 124 represents what can be termed the home market for the investor. System 100 is divided into regions 124 and 126 for purposes of illustration. The division is not necessarily intended to represent any specific geographic location, or separation of the various entities that comprise system 100. Although, it will often be the case that the locations illustrated in FIG. 1 will correspond to actual geographic locations for the various entities.

Thus, in home market 124, DR authority 102 can be interfaced with a clearing agent authority 110, an ADR bank authority 112, and a foreign exchange dealer authority 114, and in the local market with a local clearing agent authority 120. In turn, ADR bank authority 112 can be interfaced with a local custodian authority 118 in local market 126. Similarly, foreign exchange dealer authority can be interfaced with a local foreign exchange dealer authority 116. The local clearing agent authority 120 can be interfaced with a local broker through terminal 122 and with local custodian authority 118.

The local broker can actually be DR authority 102. In other words, trades in local market 126 can actually be accomplished via DR authority 102 or a related system interfaced with DR authority 102. Thus, terminal 122 can, in certain embodiments, simply comprise an interface into the local equity exchange. Alternatively, the local broker can be a third party. In the descriptions below, it is assumed that the local broker is a third party. But it should be remembered that the trade directions provided to the local broker can actually be carried out by DR authority 102 depending on the embodiment.

The term "authority" used to identify various entities comprising system 100 is intended to indicate that the various entities communicate with each other through the computing systems, hardware and software, associated with each entity. Thus, depending on the entity the term authority can refer to one or more servers, such as Internet or web servers, file servers, and/or database servers, one or more routers, one or more databases, one or more software applications, one or more Application Program Interfaces (APIs), or some combination thereof. Further, the computing systems associated with the various entities can include one or more computers or computer terminals.

The ability of the various entities comprising system 100 to interface directly with the computing systems of other entities comprising system 100 allows instruction to be exchanged between the various entities that automate the DR conversion and cancellation processes. Such automation enables the investor to trade directly in the local market and to clear and settle trades in DRs or U.S. dollars through a U.S. clearing and settlement system. This ability provides the investor with speed of trade execution, anonymous trading, and cost effective trading that current solutions cannot provide.

The various entities included in system 100 can be configured to communicate with each other using any of a plurality of common communication protocols. Some such protocols can be widely adopted within the banking/equity brokerage industry, such as standardized SWIFT and/or FIX messages. Others can be less widely used. For example, DR authority 102 can be configured to use to communicate with various other entities included in system 100 via TCP/IP and/or HTTP protocols. From a security standpoint, it is preferable to use highly secure, standardized communication protocols such as the SWIFT or FIX protocols. SWIFT and or FIX messages are known and will not be described in detail here. It will be understood, however, that the systems and methods described herein are not limited to any particular protocol.

Figure 2:
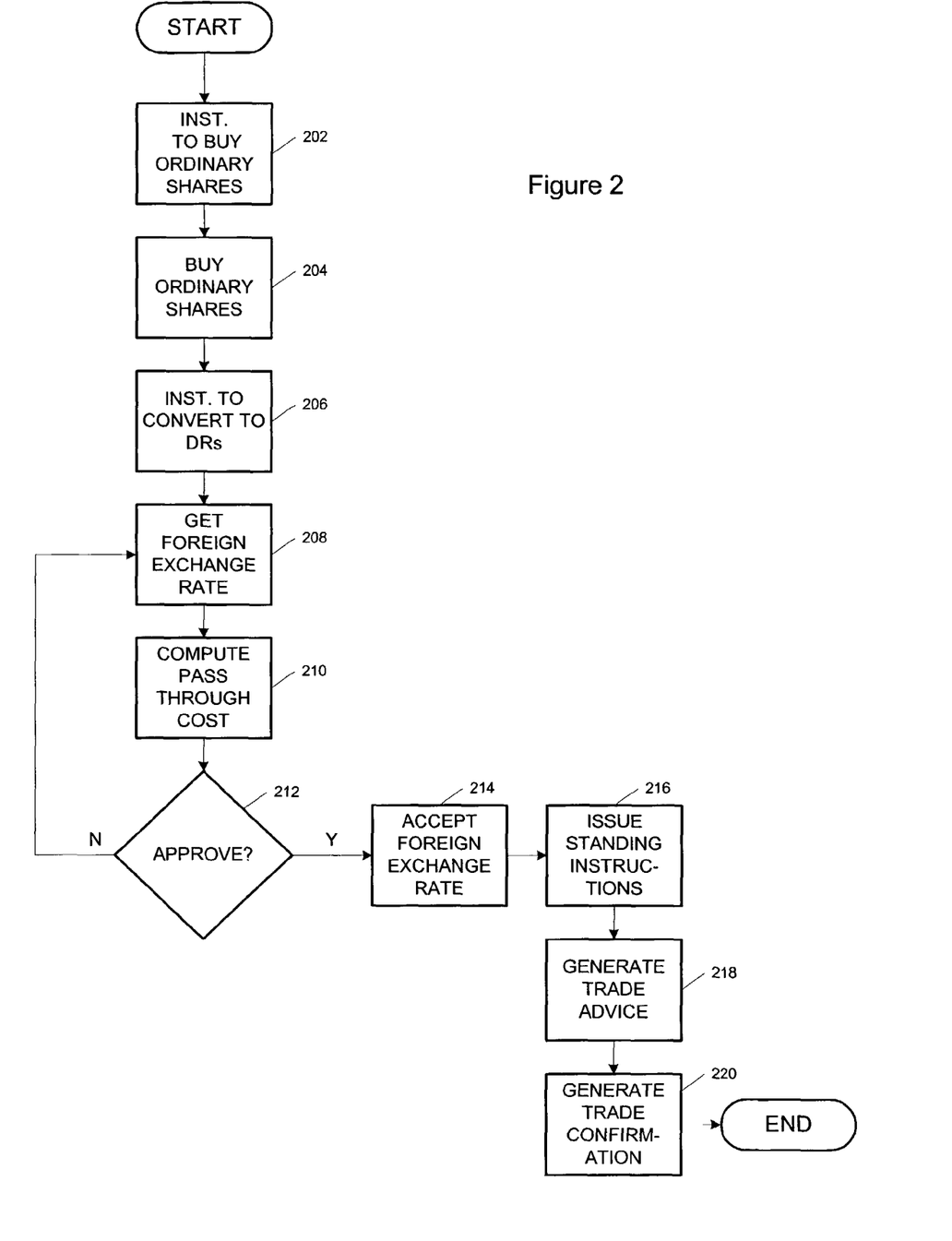
FIG. 2, is a flow chart illustrating an exemplary processes for converting ordinary shares to DRs using the system of FIG. 1 in accordance with one embodiment of the invention.

FIG. 2 is a flow chart illustrating an example process for converting purchases ordinary shares into DRs in accordance with one embodiment of the invention. The process of FIG. 2 can be used to begin illustrating how DR authority 102, and the various other entities of system 100, interface with each other in an automated fashion that provides investors the ability to trade directly in local equity markets and to clear and settle the trades in DRs and U.S. dollars through a U.S. clearing and settlement system. The process begins in step 202 when an investor places an order to purchase ordinary shares of a non-U.S. company. In step 204 a local broker in local market 126 will purchase the ordinary shares to fill the investor's order placed in step 202. At this point, the investor can receive a trade advice, telling the investor what they ordered. In step 206, the investor then instructs DR authority 102 to convert the purchased ordinary shares into DRs through terminal 108. Alternatively, in certain embodiments, the investor can actually place a telephone call, or send a fax message, or something similar, to DR authority 102, with instructions to convert the purchase ordinary shares. Clearly, from an automation and convenience point of view, the ability to simply input the instructions through terminal 108 is the preferred method.

In one embodiment, the investor can place the order for ordinary shares through DR authority 102. Thus, DR authority 102 can be configured to receive the order and place a standing order with the local broker along with instruction to deliver the purchased ordinary shares to a local clearing agent. DR authority 102 can be configured to then issue directions to the local clearing agent to transfer the shares to a clearing agent in home market 124, e.g., the clearing agent associated with clearing agent authority 110, for distribution to the client. Thus, when the investor instructs DR authority 102 to convert the purchased shares to DRs, DR authority 102 can verify the ordinary share transaction and begin the conversion process. Alternatively, the ordinary share transaction information can be provided by another system interfaced with DR authority 102.

There can be several reasons why the investor may want to purchase the ordinary shares in the local market 126 and then have them converted to DRs as opposed to, for example, just purchasing the ordinary shares or purchasing DRs in home market 124. For example, the investor can actually be an institutional investor that is purchasing shares for one of its clients. The investor may need to pay the client in U.S. dollars when shares are sold and deliver shares tradable in the U.S. when purchasing shares on behalf of the client. The investor can often simply purchase DRs in the U.S. market, rather than purchasing ordinary shares in the local market and having them converted to DRs, but it many instances buying DRs in the U.S. market will push the price of the DRs up. This is because often 90% of the liquidity in the equity of a non-U.S. company is in local market 126. Accordingly, if the investor buys in local market 126, then the purchase will likely have very little effect on the overall share price. Therefore, it can be preferable to purchase shares in local market 126, rather than DRs in home market 124

Once DR authority 102 receives the DR conversion instruction, it can be configured to determine the pass through cost for the conversion (step 210). This is where the information stored in database 104 can come into play. In one embodiment, database 104 is configured to store information related to the conversion to, and/or cancellation of DRs. The information can then be used to calculate the pass through cost. For example, database 104 can be configured to store information related to the investor, to the local market, to the ordinary shares involved, and information related to the various costs associated with the various entities involved in the transaction, e.g., the foreign exchange dealer, the ADR bank, the clearing agent, etc.

Investor information stored in database 104 can, for example, include who the investor is and any special pricing provided to the investor.

Thus, the investor doesn't need to worry about selecting a local broker. From the investor's point of view, the process can be much more automated. The investor simply indicates the desired number of ordinary shares and the desire to have them converted to DRs. DR authority 102 can be configured to then take over and handle the transaction. Preferably, from the investor's point of view, the investor then just receives their trade advice and confirmation as will be described in more detail below. If the investor desires, however, the investor can be provided with detailed information related to the issuance and conversion processes. This is described in more detail below.

The information stored in database 104 can, for example, be organized as a set of tables 106 from which DR authority can gather the relevant information to calculate the pass through cost for the transaction. The final piece of information needed by DR authority 102 to determine the pass through cost is the exchange rate from dollars, which will be used by the investor assuming the investor's home market 124 is the U.S., to the local currency used in local market 126. Thus, DR authority 102 can be configured to automatically establish communication with foreign exchange dealer authority 114 to obtain a foreign exchange rate quote in step 208. The foreign exchange rate quoted is preferably a firm quote. Therefore, such a quote is often valid for a limited period of time, e.g., 30 seconds. In which case, the foreign exchange rate will need to be accepted within the requisite time period in order to lock in the rate quoted in step 208.

As opposed to conventional systems, therefore, the investor is provided a specific time of day rate instead of a broker selected range for the day.

Using the foreign exchange rate quoted in step 208, and the information stored in database 104, DR authority 102 can now compute the pass through cost for the transaction. Generally, the pass through cost is based on the cost of the principal cost of the trade, various local market and DR market transaction fees, a commission associated with DR authority 102, and the foreign exchange rate. The pass through cost can, for example, comprise the cost to the investor of the ordinary shares purchased in the local market, plus any costs to execute and settle the ordinary share transaction, e.g., local broker fees, etc. This sum can then be multiplied by the exchange rate quoted in step 208 and added to the sum of the cost to the investor to issue the DRs, the recapture cost associated with any anticipated financing, the costs to settle the DR portion of the transaction, and various commissions, fees, etc.

Once the pass through cost is computed in step 210, it can be presented to the investor, e.g., through terminal 108, for approval in step 212. The pass through cost can, for example, be computed in cents or in basis points as required. If the investor doesn't approve the pass through cost in step 212, DR authority can be configured to revert to step 208 and request a new foreign exchange quote, which will then result in the re-computing of the pass through cost. This can continue, for example, until the investor approves a pass through cost or terminates the transaction. Once the investor does approve the pass through cost in step 212, DR authority 102 can be configured to then accept the quoted exchange rate in step 214, assuming that the quote is still valid, i.e., the time period for which the quote remains valid has not elapsed.

Once the foreign exchange rate is accepted, DR authority 102 can be configured to automatically issue directions related to the DR process, in step 216, to various entities, or more specifically to the computer authorities associated with the various entities, that will be involved in the transaction. The directions will result in the process flow illustrated in FIG. 3 and described in detail below. Each authority receiving the directions communicated in step 216 can comprise a database that includes instructions and information needed to carry out the directions and effect the transactions. The ability to communicate in what is essentially a database-to-database fashion, improves message integrity and increases efficiency due to the automated handling of the directions. In addition to providing the investor with a more seamless and convenient process, this can also, for example, enable an increase in trading volume, which can benefit all participants.

The pass through cost can actually be continually displayed to the investor through terminal 108. For example, in certain embodiments, the investor can run a client application on terminal 108 that is configured to display information for certain DRs, e.g., certain DRs selected by the investor. DR authority 102 can be configured to periodically, or non-periodically, obtain exchange rate information for the DRs displayed to the investor, compute the pass through cost, and then send the computed pass through cost to terminal 108 to be displayed to the investor. Thus, the investor can continuously view updated information on the price for certain DRs. Further, DR authority 102 can also be configured to send some or all of the information in database 104, for the DRs being displayed to the user, to terminal 108. This information can then be displayed along with the pass through cost. For example, DR authority 102 can be configured to send the ordinary share price and foreign exchange rate to terminal 102, which can be configured to then display the information to the investor.

Once the ordinary shares are converted to DRs, DR authority 102 can be configure to generate a DR advice and send it to terminal 108 in step 218, e.g. via email or some other electronic message. Once the transaction is completed, DR authority 102 can be configured to then generate a trade confirmation for the investor in step 220. The confirmation can be a hard copy confirmation that combines information related to the ordinary share transaction and the DR transaction. The confirmation can, for example, include the ordinary share price, the foreign exchange rate, the pass through cost, and commission rates, or some combination thereof.

Further, DR authority can be configured to track and store all trade related information. Such information can, for example, be stored in database 104. Thus, DR authority 102 can, among other things, use the stored trade related information to generate and present historical DR trade information to the investor via terminal 108.

Figure 3:
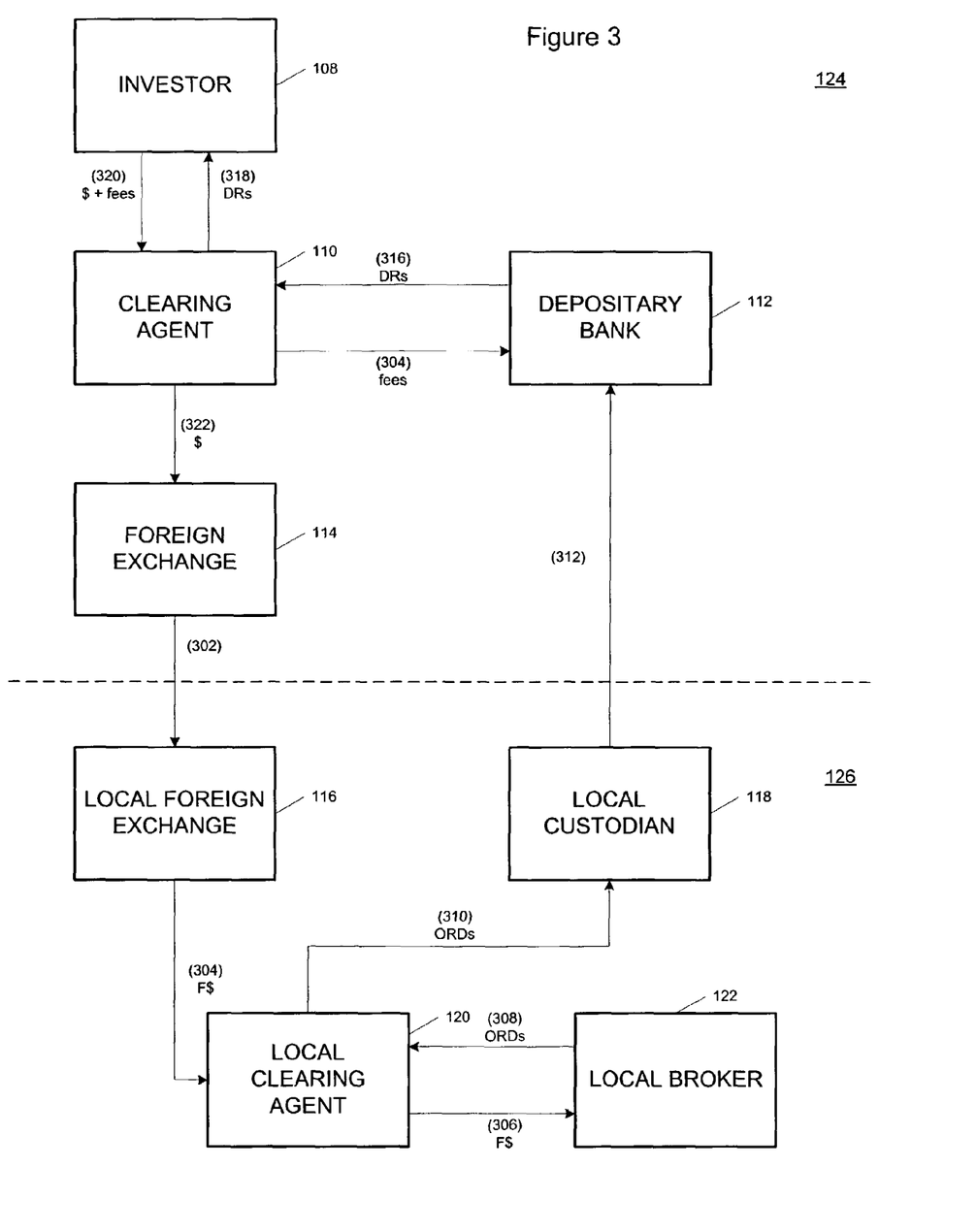
FIG. 3 is a flow diagram illustrating an exemplary process of converting ordinary shares to DRs in conjunction with the method of FIG. 2.

FIG. 3 is a flow chart illustrating the steps involved in issuing DRs in accordance with one embodiment of the systems and methods described herein. Thus, once DR authority 102 accepts the foreign exchange rate quoted by foreign exchange dealer authority 114, it can be configured to then send directions to foreign exchange dealer authority 114, directing the foreign exchange dealer to transfer foreign currency to the local clearing agent to cover the purchase of ordinary shares in step 302. In the embodiment illustrated in FIG. 3, this direction will cause the foreign exchange dealer authority 114 to generate and send directions to local foreign exchange dealer authority 116 to transfer the foreign currency to the local clearing agent in step 304.

DR authority 102 can be configured to then send directions to local clearing agent 120 to transfer the foreign currency to the local broker, in step 306, in exchange for the purchased ordinary shares, which are received in step 308. The direction sent to local clearing agent authority 120 can also direct that the ordinary shares received in step 308 be transferred to the local custodian in step 310. Once the ordinary shares are received in step 310, local custodian authority 118 can generate and send a notice to ADR bank authority 112 indicating that the ordinary shares were received.

DR authority 102 can be further configure to send clearing agent authority 110 directions to transfer a fee to the ADR bank in step 314 in exchange for the ADR bank issuing the DRs and transferring them in step 316. The ADR bank will generally issue the DRs after receipt of the fee and notice that the ordinary shares have been received. DR authority 102 can also provide directions to clearing agent authority 110 directing the clearing agent to transfer the DRs to the investor in step 318 in exchange for the pass through cost computed in step 210, which is transferred in step 320. Finally, DR authority can also direct the clearing agent to transfer the payment, based on the exchange rate agreed to, to the foreign exchange dealer in step 322.

In terms of time, all of the steps illustrated in FIG. 3 can occur on the settlement date, which is generally a certain number of days after the trade date. In certain instances, either due to time differences, differing settlement dates used in local market 126 relative to home market 124, or to trouble closing the ordinary share transaction, the ordinary shares will not reach the local custodian by the settlement date. In such an event, the clearing agent can be directed to pre-release the DRs from the ADR bank in order to get them to the investor on the settlement date in home market 124. In this case, the clearing agent can be directed to transfer collateral to ADR bank, e.g., cash equal to 102% of the value of the DRs. Once the ADR bank receives the collateral, it will issue the DRs as before. Once the ordinary shares do reach the local custodian (step 310) and notice is sent to the ADR bank (step 312), then the ADR bank will return the collateral. The ability to borrow the DRs avoids transaction failures.

An alternative to the pre-release process just described is to actually borrow the DRs from a securities lending institution. In this case, the borrowed DRs are received in exchange for collateral and are delivered to the investor in settlement of the trade. When the DRs issued by the ADR bank are finally received, they are delivered to the securities lending institution, which then returns the collateral. Preferably, the investor is unaware of which process is used. DR authority 102 can be configured to decide whether to borrow the DRs or have them pre-released based on the associated transaction costs.

Often, the actual delivery of DRs and funds in home market 124 will be accomplished via a securities clearing house such as the DTC. Thus, the various participating entities will have accounts with DTC for example. The transfer of funds and/or DRs is then accomplished within DTC via book entry transfers between the accounts of the various entities. Similarly, a local securities clearing house can be used to affect the deliveries required in local market 126. The use of a securities clearing house is well known and will not be described in detail here.

Figure 4:
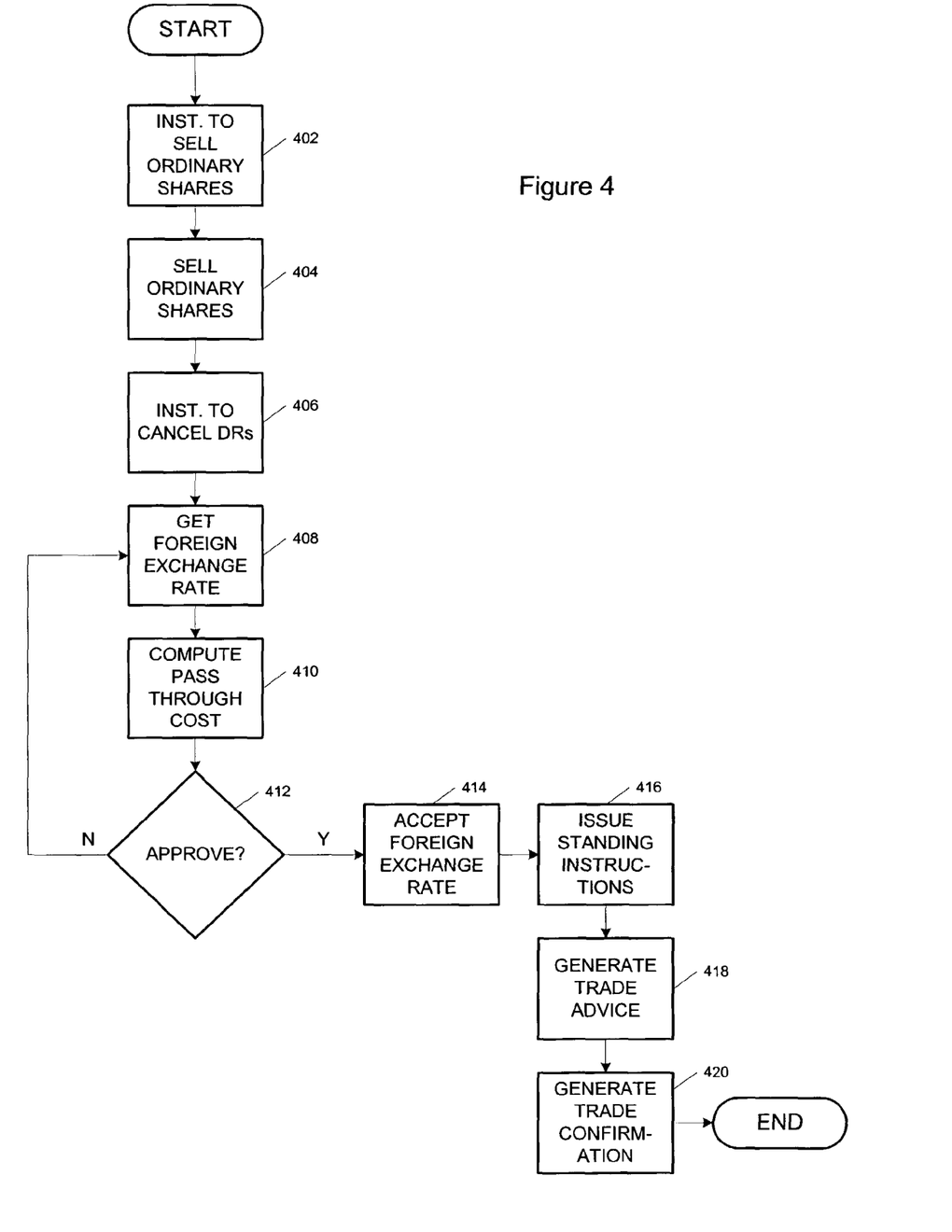
FIG. 4, is a flow chart illustrating an exemplary processes for canceling DRs using the system of FIG. 1 in accordance with one embodiment of the invention.

FIG. 4 is a flow chart that is similar to FIG. 2, but which illustrates an example process for canceling DRs in accordance with one embodiment of the systems and methods described herein. In general, the processes used to complete the steps illustrated in FIG. 4 are the same as those described in relation to FIG. 2. A main difference is that DRs are being cancelled instead of issued. Thus, in step 402, an investor can initiate the sale of ordinary shares in local market 126. As with the purchase of ordinary shares, the sale can be handled, at least in part, by DR authority 102. In step 404, the local broker can sell the ordinary shares in the local market. In step 406, the investor can direct DR authority 102 to cancel DRs in order to satisfy the sale commenced in step 402. If DR authority 102 handled the sale initiated in step 402, then DR authority 102 should have the information needed to begin the cancellation process. If not, then this information should be provided to DR authority 102.

Once the cancellation request is received in step 406, DR authority can automatically establish a connection, in step 408, with foreign exchange dealer authority 114 and request a foreign exchange rate for the transaction. DR authority 102 can then compute, in step 410, the pass through cost for the investor using the foreign exchange rate quoted by foreign exchange dealer authority 114 and the information stored in database 104, e.g., in tables 106. The pass through cost can be computed in the same manner as described above. In step 412, the computed pass through cost can be presented to the investor via terminal 108 for approval. If approved, then DR authority can accept the quoted foreign exchange rate in step 414 and automatically establish communication with, and issue commands to, the various entities involved in step 416. If the investor rejects the pass through cost in step 412, then the process can revert to step 408 in which a new foreign exchange rate quote is obtained, or the process can terminate if an acceptable pass through cost cannot be achieved. As with the issuance process of FIG. 2, the investor will often have a fixed amount of time in which to accept the pass through cost and in turn cause the foreign exchange rate to be accepted.

After the DRs are cancelled, the investor can receive a DR advice through terminal 108 in step 418, e.g. via email or some other electronic message. The DR advice can be automatically generated by DR authority 102 based on information tracked and stored by DR authority 102 related to the transaction. After the transaction is complete, then DR authority can be configured to automatically generate a trade confirmation in step 420, which can be a hard copy confirmation that combines information related to the ordinary share transaction and the DR transaction.

Figure 5:
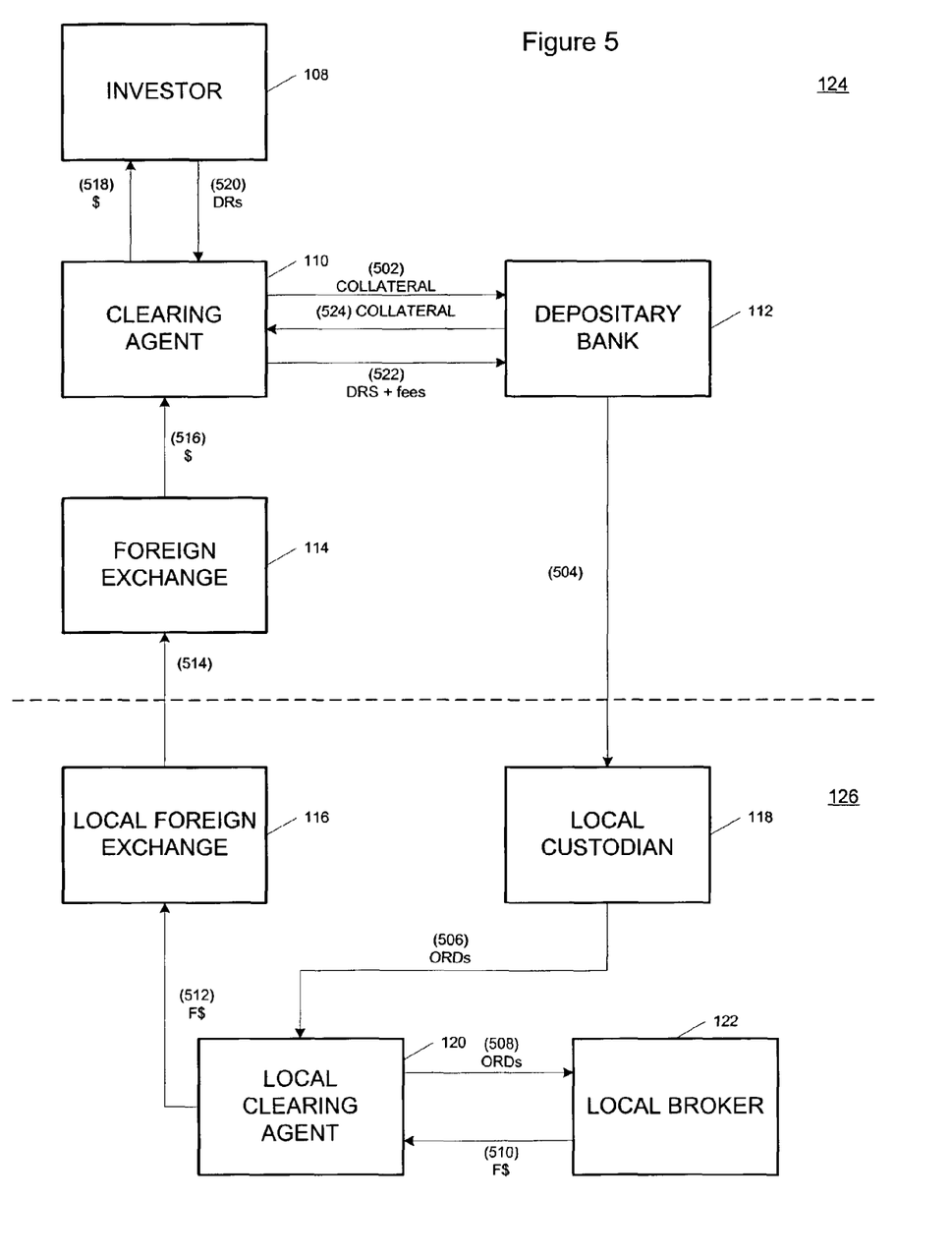
FIG. 5 is a flow diagram illustrating an exemplary process of canceling DRs in conjunction with the method of FIG. 2.

FIG. 5 is a flow chart that illustrates the steps of canceling the shares in accordance with one embodiment of the systems and methods described herein. First, in step 502, DR authority can be configured to automatically send directions to clearing agent authority 110 that direct the clearing agent authority to transfer collateral to the ADR bank to cover the ordinary shares that will need to be pre-released for the transaction. Alternatively, the ordinary shares can be borrowed from a securities lending institute similar to the manner described above in which DRs are borrowed. The ordinary shares need to be pre-released, or borrowed depending on the implementation, because on the settlement date, the investor is going to deliver their DRs, but on that date, the ordinary shares will also need to be delivered to the local broker. Thus, the ordinary shares must be pre-released or borrowed so that they can be delivered when required.

DR authority can be configured to also send directions to ADR bank authority 112 that direct ADR bank authority 112 to forward directions to local custodian authority 118, in step 504, directing the local custodian to forward the ordinary shares to the local clearing agent, once the collateral is received in step 502. Upon receiving the directions in step 504, the local custodian will forward the ordinary shares in step 506.

DR authority 102 can also be configured to send directions to local clearing agent authority 120, directing the local clearing agent to receive the ordinary shares in step 506, and deliver them to the local broker in step 508. The directions can also direct the local clearing agent to receive foreign currency, in step 510, in exchange for the ordinary shares and to deliver the foreign currency to the local foreign exchange dealer in step 512. Local foreign exchange dealer authority 116 can be configured to notify foreign exchange dealer authority 114, in step 514, when the local foreign exchange dealer has received the foreign currency. DR authority can be configured to send directions to foreign exchange dealer authority 114 to transfer funds to the clearing agent, in step 516, once the notification is received in step 514.

DR authority 102 can also be configured to send directions to clearing agent authority 110, directing the local clearing agent to transfer funds to the investor in step 518 in exchange for the DRs, which are received in step 520. The directions can also direct the clearing agent to transfer the DRs to the ADR bank, in step 522, in exchange for a return of the collateral in step 524.

Thus, steps 502 to 506 can occur before the actual settlement date. In one particular embodiment, these steps occur one day before the settlement date.

It should also be noted, that the transfers of shares, DRs, and funds, from entity to entity can occur via a securities settlement house as described above with respect to FIG. 3. Again, the use of a securities settlement house will not be described in detail here.

Figure 6:
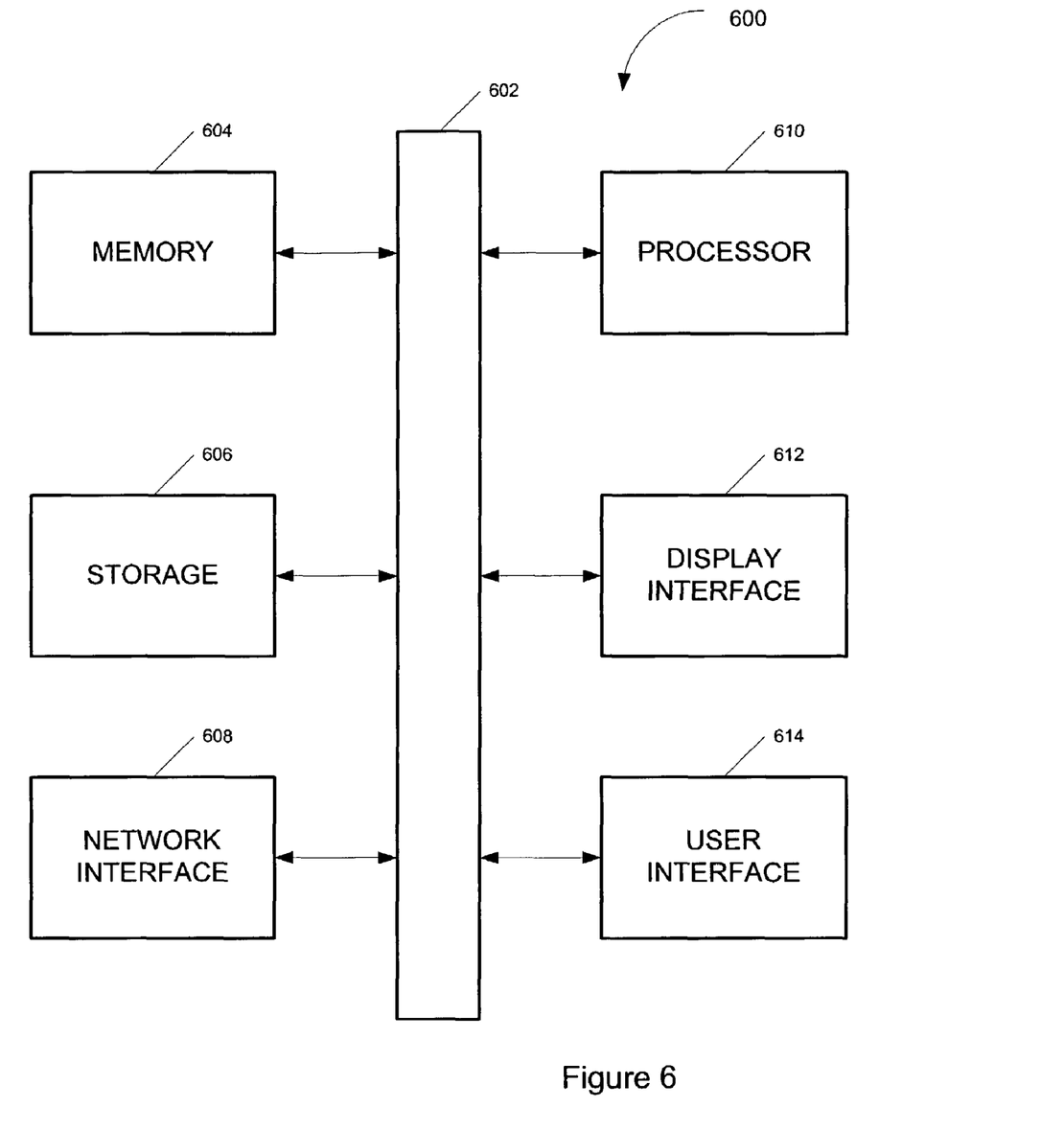
FIG. 6 is a logical block diagram illustrating an exemplary computer system that can be included in the system of FIG. 1.

FIG. 6 is a logical block diagram illustrating an example embodiment of a computer system 600 that can, for example, be included in the computer systems that comprise the various entities of system 100. As will be understood, some type of processing system is usually at the heart of any computer system, whether the processing system includes one or several processors included in one or several devices. Thus, the computer system 600 of FIG. 6 is presented as a simple example of a processing system. In the example of FIG. 6, computer system 600 comprises a processor 610 configured to control the operation of computer system 600, memory 604, storage 606, a network interface 608, a display output 612, a user interface 614, and a bus 602 configured to interface the various components comprising computer system 600.

Processor 610 can comprise a plurality of processing circuits, such as math coprocessor, network processors, digital signal processors, audio processors, etc. These various circuits can be included in a single device or multiple devices. Processor 610 can also comprise an execution area into which instructions stored in memory 604 can be loaded and executed by processor 610 in order to control the operation of computer system 600. Thus, for example, by executing instructions stored in memory 604, processor 610 can cause DR authority 102 to execute the steps described above.

Memory 604 can comprise a main memory configured to store the instructions just referred to. It can, for example, also comprise secondary memory used to temporarily store instructions or to store information input into computer system 600, i.e., memory 604 can be scratch memory. Memory 604 can comprise a plurality of memory circuits, which can be included as a single device, or as a plurality of devices.

Storage 606 can include a plurality of drives configured to receive various electronic media. For example, storage 606 can include a floppy drive configured to receive a floppy disk, a compact disk drive configured to receive a compact disk, and/or a digital video disk drive configured to receive a digital video disk. Storage 606 can also, for example, include disk drives, including removable disk drives. The drives included in storage 606 can be used to receive electronic media that has stored thereon instructions to be loaded into memory 604 and used by processor 610 to control the operation of computer system 600.

Network interface 608 is configured to allow computer system 600 to interface with, and communicate over, a network. Thus, using a network interface, such as network interface 608, the various entities comprising system 100 can communicate with each other. Each entity comprising system 100 can include one or multiple network interfaces 608 as required.

Display interface 612 can be configured to allow computer system 600 to interface with a display. Thus, computer system 600 can display information to a user, if required, via display interface 612.

User interface 614 can be configured to allow a user to interface with computer system 600. Thus, user interface 614 can include a mouse interface, a keyboard interface, an audio interface, etc.

It should be clear that the general description of a computer system provided above is by way of example only and should not be seen to limit implementation of the various authorities comprising system 100 to any particular computer architecture or implementation. Rather any architecture or implementation capable of implementing the processes and functionality described above can be used to implement the systems and methods described herein.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A Depositary Receipt authority system, comprising:
   at least one computer network;
   a database configured to store information related to the issuance and cancellation of Depositary Receipts;
   computer memory configured to store instructions; and
   a processor coupled with the memory, the database, and the at least one computer network, the processor configured to execute the instructions, the instructions configured to cause the processor to: receive a request from another processor via the at least one computer network to convert purchased ordinary shares to Depositary Receipts; automatically communicate directions to certain computer systems via the at least one computer network to facilitate the conversion of purchased ordinary shares to Depositary Receipts; obtain a foreign exchange rate quote for the conversion from a foreign exchange dealer authority; determine a pass through cost to convert the ordinary shares based on the quoted foreign exchange rate and the information stored in the database; present the determined pass through cost for approval; receive an approval of the determined pass through cost; and accept the quoted foreign exchange rate based on the received approval.

2. The Depositary Receipt authority system of claim 1, wherein the instructions are further configured to cause the processor to automatically establish a connection with a clearing agent authority and issue directions to the clearing agent authority to facilitate the conversion of the purchased ordinary shares.

3. The Depositary Receipt authority system of claim 2, wherein the directions are configured to cause the clearing agent authority to:
  remit a fee to an American Depositary Receipt bank in exchange for issued Depositary Receipts;
  deliver the Depositary Receipts to an investor in exchange for payment of the pass through cost; and
  transfer a payment to a foreign exchange dealer based on an accepted foreign exchange rate.

4. The Depositary Receipt authority system of claim 2, wherein the directions are configured to cause the clearing agent authority to:
  deliver collateral to an American Depositary Receipt bank in exchange for the American Depositary Receipt bank pre-releasing the Depositary Receipts;
  remit an issuance fee to the American Depositary Receipt bank in exchange for the Depositary Receipts;
  deliver the Depositary Receipts to an investor in exchange for payment of the pass through cost; and
  transfer a payment to a foreign exchange dealer based on the accepted foreign exchange rate.

5. The Depositary Receipt authority system of claim 4, wherein the directions are further configured to cause the clearing agent authority to receive a return of the collateral from the bank.

6. The Depositary Receipt authority system of claim 1, wherein the instructions are further configured to cause the processor to automatically establish a connection with an American Depositary Receipt bank authority and to issue directions to the American Depositary Receipt bank authority.

7. The Depositary Receipt authority system of claim 6, wherein the directions are configured to cause the American Depositary Receipt bank authority to:
  instruct a local custodian authority to receive the purchased ordinary shares from a local clearing agent;
  receive a notice from the local custodian authority when the local custodian authority receives the purchased local shares from the local clearing agent; and
  issue the Depositary Receipts to a clearing agent in exchange for a fee.

8. The Depositary Receipt authority system of claim 6, wherein the directions are configured to cause the American Depositary Receipt bank authority to:
  receive collateral;
  pre-release the Depositary Receipts to a clearing agent in exchange for delivery of the collateral; and
  receive a fee in exchange for delivery of the Depositary Receipts.

9. The Depositary Receipt authority system of claim 8, wherein the directions are further configured to cause the American Depositary Receipt bank authority to:
  instruct a local custodian authority to receive the purchased ordinary shares from a local clearing agent;
  receive a notice from the local custodian authority when the local custodian authority receives the purchased local shares from the local clearing agent; and
  return the collateral once the notice is received from the local custodian authority.

10. The Depositary Receipt authority system of claim 1, wherein the instructions are further configured to cause the processor to automatically establish a connection with a foreign exchange dealer authority and to issue directions to the foreign exchange dealer authority, the directions configured to cause the foreign exchange dealer authority to:
  issue an instruction to a local foreign exchange dealer authority to deliver foreign currency to a local clearing agent; and
  receive a payment from a clearing agent.

11. The Depositary Receipt authority system of claim 1, wherein the instructions are further configured to cause the processor to automatically establish a connection with a local clearing agent authority and to issue directions to the local clearing agent authority, the directions configured to cause the local clearing agent authority to:
  receive the purchased ordinary shares from a local broker and deliver the purchased ordinary shares to a local custodian; and
  receive foreign currency from a local foreign exchange dealer and deliver the foreign currency to the local broker in exchange for the purchased ordinary shares.

12. A Depositary Receipt authority system, comprising:
  at least one computer network;
  a database configured to store information related to the issuance and cancellation of Depositary Receipts;
  computer memory configured to store instructions; and
  a processor coupled with the memory, the database, and the at least one computer network, the processor configured to execute the instructions, the instructions configured to cause the processor to: receive a request from another processor via the at least one computer network to cancel Depositary Receipts associated with the sale of ordinary shares; automatically communicate directions to certain computer systems via the at least one computer network to facilitate the cancellation of the Depositary Receipt; automatically establish a connection with a foreign exchange dealer authority in response to the received request and obtain a foreign exchange rate quote for the cancellation from the foreign exchange dealer authority; determine a pass through cost to cancel the Depositary Receipts based on the quoted foreign exchange rate and the information stored in the database; present the determined pass through cost for approval; receive an approval of the determined pass through cost; and accept the quoted foreign exchange rate based on the received approval.

13. The Depositary Receipt authority system of claim 12, wherein the instructions are further configured to cause the processor to automatically establish a connection with a clearing agent authority and issue directions to the clearing agent authority to facilitate the cancellation of the Depositary Receipts.

14. The Depositary Receipt authority system of claim 13, wherein the directions are configured to cause the clearing agent authority to:
  deliver collateral to an American Depositary Receipt bank in exchange for the American Depositary Receipt bank pre-releasing ordinary shares;
  receive funds from a foreign exchange dealer;
  deliver a settlement amount from the received funds to an investor in exchange for the Depositary Receipts;
  deliver the Depositary Receipts to the American Depositary Receipt bank; and
  remit a cancellation fee to the American Depositary Receipt bank.

15. The Depositary Receipt authority system of claim 14, wherein the directions are further configured to cause the clearing agent authority to receive a return of the collateral from the American Depositary Receipt bank once the Depositary Receipts are delivered.

16. The Depositary Receipt authority system of claim 13, wherein the instructions are further configured to cause the processor to automatically establish a connection with an American Depositary Receipt bank authority and to issue directions to the American Depositary Receipt bank authority.

17. The Depositary Receipt authority system of claim 16, wherein the directions are configured to cause the American Depositary Receipt bank authority to:
   instruct a local custodian authority to release ordinary shares to a local clearing agent;
   receive the Depositary Receipts from a clearing agent; and
   cancel the Depositary Receipts in exchange for a fee.

18. The Depositary Receipt authority system of claim 17, wherein the directions are configured to cause the American Depositary Receipt bank authority to: receive the collateral; and return the collateral once the Depositary Receipts are received from the local clearing agent.

19. The Depositary Receipt authority system of claim 13, wherein the instructions are further configured to cause the processor to automatically establish a connection with a foreign exchange dealer authority and to issue directions to the foreign exchange dealer authority, the directions configured to cause the foreign exchange dealer authority to:
   issue an instruction to a local foreign exchange dealer authority to receive foreign currency from a local clearing agent; and
   deliver a payment to a clearing agent.

20. The Depositary Receipt authority system of claim 13, wherein the instructions are further configured to cause the processor to automatically establish a connection with a local clearing agent authority and to issue directions to the local clearing agent authority, the directions configured to cause the local clearing agent authority to:
   receive ordinary shares from a local custodian and deliver the received ordinary shares to a local broker; and
   receive foreign currency from the local broker in exchange for the ordinary shares received from the local custodian and deliver the foreign currency to a local foreign exchange dealer.

21. A Depositary Receipt authority system, comprising:
   at least one computer network;
   a database configured to store information related to the issuance and cancellation of Depositary Receipts received via the at least one computer network;
   computer memory configured to store instructions; and
   a processor coupled with the memory, the database, and the at least one computer network, the processor configured to execute the instructions, the instructions configured to cause the processor to continuously update information related to the cost of issuing and canceling certain Depositary Receipts by obtaining an updated foreign exchange quote and updating a pass through cost based on the updated foreign exchange quote and to display, based on the updated foreign exchange quote and the updated pass through cost, the continuously updated information based on the information related to the issuance and cancellation of Depositary Receipts received via the at least one computer network.

22. The Depositary Receipt authority system of claim 21, wherein the information stored in the database includes at least one of conversion ratio, information related to an investor, information related to a local market, and information related certain costs associated with the issuance or cancellation of the certain Depositary Receipts.

23. The Depositary Receipt authority system of claim 22, wherein the information related to an investor comprises information related to special pricing given to the investor.

24. The Depositary Receipt authority system of claim 22, wherein the information related to a local market includes information related to local brokers for the local market.

25. The Depositary Receipt authority system of claim 21, wherein the instructions are further configured to cause the processor to store information related to the issuance and cancellation of the certain Depositary Receipts.

26. The Depositary Receipt authority system of claim 25, wherein the instructions are further configured to cause the processor to store information related to the underlying ordinary share transaction.

27. The Depositary Receipt authority system of claim 25, wherein the instructions are further configured to cause the processor to display historical information related to past issuance or cancellation of Depositary Receipts.

28. The Depositary Receipt authority system of claim 21, wherein the information displayed includes a foreign exchange rate.

29. The Depositary Receipt authority system of claim 21, wherein the information displayed includes a pass through cost.

30. The Depositary Receipt authority system of claim 21, wherein the information displayed includes an ordinary share price.

31. A method for trading in a local market with clearing and settlement in Depositary Receipts and U.S. dollars, comprising:
   automatically establishing a connection between a first processor and a second processor, wherein the second processor is part of a foreign exchange dealer authority, via at least one computer network;
   requesting a foreign exchange rate from the second processor of the foreign exchange dealer authority;
   receiving via the at least one computer network a foreign exchange rate quote in response to the foreign exchange rate request;
   automatically determining using the first processor a pass through cost for the issuance or cancellation of Depositary Receipts based on the quoted foreign exchange rate and information stored in a database electronically coupled to the first processor;
   presenting the determined pass through cost for approval;
   receiving an approval of the determined pass through cost; and
   accepting the quoted foreign exchange rate based on the received approval.

32. The method of claim 31, further comprising automatically establishing a connection with a clearing agent authority and issuing directions to the clearing agent authority.

33. The method of claim 31, further comprising automatically establishing a connection with an American Depositary Receipt bank authority and issuing directions to the American Depositary Receipt bank authority.

34. The method of claim 31, further comprising automatically establishing a connection with a foreign exchange dealer authority and automatically issuing directions to the foreign exchange dealer authority.

35. The method of claim 31, further comprising automatically establishing a connection with a local clearing agent authority and automatically issuing directions to the local clearing agent authority.

* * * * *